M. RITTER.
BICYCLE.
APPLICATION FILED NOV. 29, 1916.

1,220,560.

Patented Mar. 27, 1917.

WITNESS
A. Spitznagel

INVENTOR
Mathew Ritter

BY
ATTORNEY

UNITED STATES PATENT OFFICE.

MATHEW RITTER, OF SHRUB OAK, NEW YORK.

BICYCLE.

1,220,560.  Specification of Letters Patent.  Patented Mar. 27, 1917.

Application filed November 29, 1916. Serial No. 133,999.

*To all whom it may concern:*

Be it known that I, MATHEW RITTER, a subject of the Austrian Emperor, residing at Shrub Oak, in the county of Westchester and State of New York, have invented certain new and useful Improvements in Bicycles, of which the following is a specification.

The present invention relates to cycle wheels, particularly bicycles, and has for its object to provide an attachment in form of a wheeled carriage, either for carrying out parcels or conveying passengers.

Another object of my invention is to so construct the vehicle as to be capable of being easily and readily connected to and disconnected from a bicycle of any known construction.

A further object is to arrange a vehicle which will be capable of vertical and horizontal movements independently of the bicycle so that in case the bicycle and vehicle run over different levels, or when encountering obstacles, the vehicle will be allowed to yield without affecting the bicycle.

A still further object is to provide means which will tend to constantly hold the vehicle in a position parallel to the bicycle.

With these and other objects in view, which will become obvious from the detailed description of the invention, the latter consists in the novel construction, combination and arrangement of parts as will be hereinafter more fully set forth and claimed.

Figure 1:
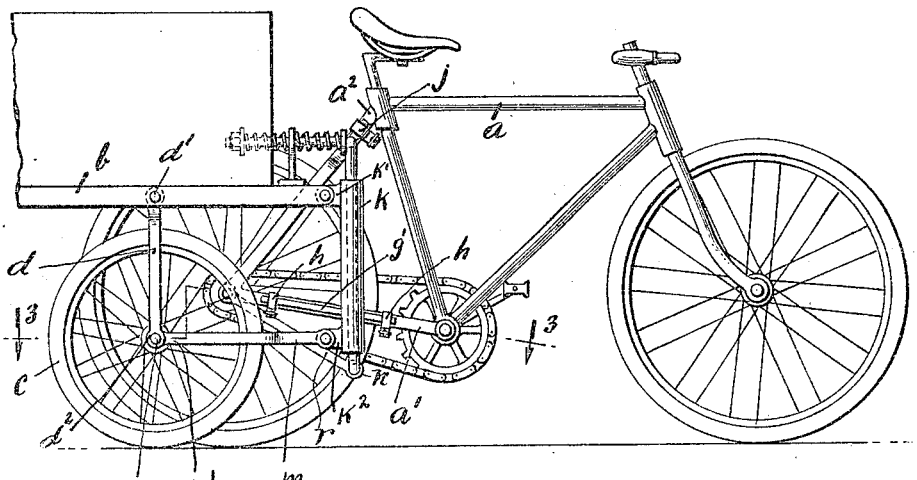
Figures 2, 5:
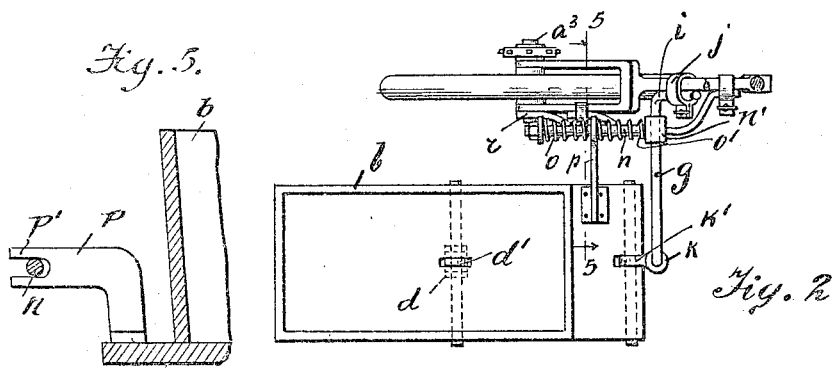
Figures 3, 4:
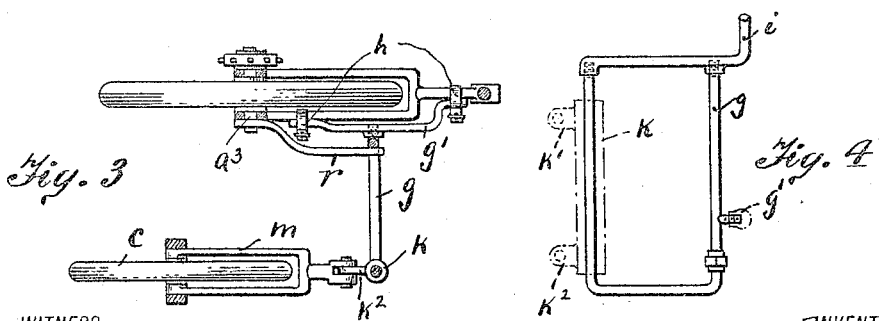

In the accompanying drawing, which forms part of this specification and in which similar reference characters denote corresponding parts, one embodiment of my invention is illustrated, Figure 1 being a side elevation of a bicycle equipped with my new attachment; Fig. 2 a top plan view thereof, a part of the bicycle being cut away; Fig. 3 a section on line 3—3 of Fig. 1; Fig. 4 is a detail of the attachment means of the vehicle, and Fig. 5 is a section on line 5—5 of Fig. 2.

In the drawing $a$ denotes the frame of a bicycle of any known construction. My attachment consists of a wheeled body $b$ which may be in the form of a receptacle for goods or a carriage for passengers. The wheel $c$ is suspended from said body by means of a forked member $d$ the upper end $d'$ of which is pivotally connected to the body $b$ and the lower ends $d^2$ of which forms a bearing for the axle $e$ of the vehicle wheel $c$. The vehicle is adapted to be attached to the bicycle so as to extend alongside thereof and to be capable of independent vertical and horizontal movements so that when the bicycle and vehicle travel over different levels or when an obstacle lies between their wheels or in the path of the wheel of the vehicle the latter will be allowed to yield vertically or horizontally without affecting the vehicle.

To accomplish this object I provide a substantially rectangular frame $g$ of wrought iron or composed of pipe sections and formed integrally with or fixed to a yoke-shaped piece $g'$ which is adapted to be removably connected to the lower part $a'$ of the frame of the bicycle, either by clamps $h$ or any other suitable means. At the upper end the rectangular frame $g$ may be provided with a projection $i$ adapted to be removably connected to the upper part $a^2$ of the bicycle frame by similar means, such as a clamp $j$ or the like. Rotatively mounted around one of the longitudinal sides of the said rectangular frame is a vertically extending sleeve $k$ provided with rearwardly projecting parts or ears $k'$, $k^2$. Part $k'$ is pivotally connected to the body $b$ and part $k^2$ to a forked link $m$ which embraces the wheel $c$ of the vehicle and the rear ends $m'$ of which are fixed to the axle $e$ thereof. The pivotal connections between the body $b$ and the sleeve $k$ on one hand and between the wheel $c$ and said sleeve on the other hand, allow the vehicle to move in vertical direction independently of the bicycle and to adapt itself to the unevenness of the ground or to pass over obstacles lying in its path without causing any jar to or disturbing the smooth run of the bicycle. The horizontal movement of the vehicle independently of the bicycle which is insured by the sleeve $k$, will enable the vehicle to yield or spread under a pressure exerted by an obstacle coming between the vehicle wheel $c$ and the bicycle without disturbing the latter.

Normally the vehicle wheel is maintained parallel to the bicycle wheels and to this end I employ the following mechanisms.

Projecting from the rigid frame $g$ is a pin or rod $n$ on which are suitably mounted two springs $o$, $o'$ and which is so attached to said frame $g$ as to be capable of swinging vertically, but not horizontally, as for instance by a sleeve $n'$ rotatively mounted on the frame $g$ as shown in Fig. 2. This rod projects rearwardly substantially parallel to the body $b$. An arm $p$ the free end $p'$ of which may be slotted or bifurcated as shown in Fig. 5 and which is fixed to and projects from the body $b$ engages with said bifurcated end the said springs, so that when it is swung in one direction, it will compress one spring and when swung in the opposite direction it will compress the other spring. The compressed spring will have the tendency to swing the arm and consequently the vehicle into its normal position, i. e. parallel to the bicycle.

The supporting frame $g$ may be suitably reinforced, as by a member $r$ of which one end is secured to the frame $g$ and the other end can be removably fixed to the axle $a^3$ of the rear wheel of the bicycle.

While I have described in detail one form of execution of my invention, it is obvious that various modifications may be made by those skilled in the art without departing from the principle of my invention. I, therefore, do not limit myself to the details described and shown, but what I claim and desire to secure by Letters Patent is:

1. The combination with a bicycle, of a carriage removably connected thereto and capable of swinging horizontally and vertically independently of said bicycle and spring actuated means for normally maintaining said carriage parallel to said bicycle.

2. The combination with a bicycle, of a wheeled carriage arranged at the side of said bicycle, and having an axle separate from the axle of the bicycle wheels, a frame removably connected to said bicycle and to which said carriage is so connected as to be capable of moving vertically and horizontally independently of the bicycle and means interposed between said removable frame and said carriage for normally maintaining the latter parallel to said bicycle.

3. The combination with a bicycle, of a wheeled carriage, a frame therefor removably connected to the side of the bicycle and to which said carriage is connected so as to be capable of swinging horizontally and vertically independently of the bicycle and means interposed between said removable frame and said carriage for normally maintaining the latter parallel to said bicycle.

4. The combination with a bicycle, of a wheeled carriage, a frame to which said carriage is pivotally connected so as to be capable of swinging horizontally and vertically independently of the bicycle, means for removably connecting said frame to said bicycle and means interposed between said removable frame and said carriage for normally maintaining the latter parallel to said bicycle.

5. The combination with a bicycle, of a wheeled carriage, a frame to which said carriage is pivotally connected so as to be capable of swinging horizontally and vertically independently of said bicycle, clamping means for removably connecting said frame to the side of the cycle frame and means interposed between said removable frame and said carriage for normally maintaining the latter parallel to said bicycle.

6. The combination with a bicycle, of a wheeled carriage, a frame removably connected to said bicycle and to which said carriage is pivotally connected so as to be able to swing horizontally and vertically independently of said bicycle and spring actuated means for normally maintaining the said carriage parallel to said bicycle.

7. The combination with a bicycle, of a wheeled carriage, a frame removably connected to said bicycle and to which said carriage is pivotally connected so as to be able to swing horizontally and vertically independently of the bicycle and spring actuated means to normally maintain the carriage wheel parallel to the bicycle wheels.

8. The combination with a bicycle, of a carriage arranged at the side of the bicycle frame and removably connected to said bicycle frame so as to be capable of swinging horizontally and vertically independently of said bicycle and spring actuated means for normally maintaining said carriage parallel to said bicycle frame.

In testimony whereof I affix my signature in presence of two witnesses.

MATHEW RITTER.

Witnesses:
HORACE TRÖHNER,
FRANK H. LINDENAU.